Dec. 30, 1947.   C. G. LOFGREN ET AL   2,433,567
EMERGENCY TIRE CHAIN FOR TRUCKS
Filed March 10, 1947
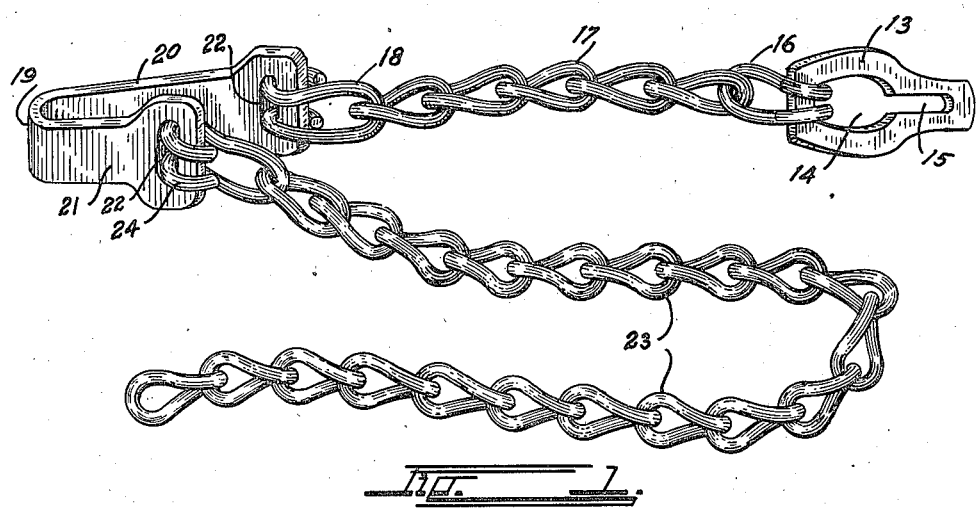
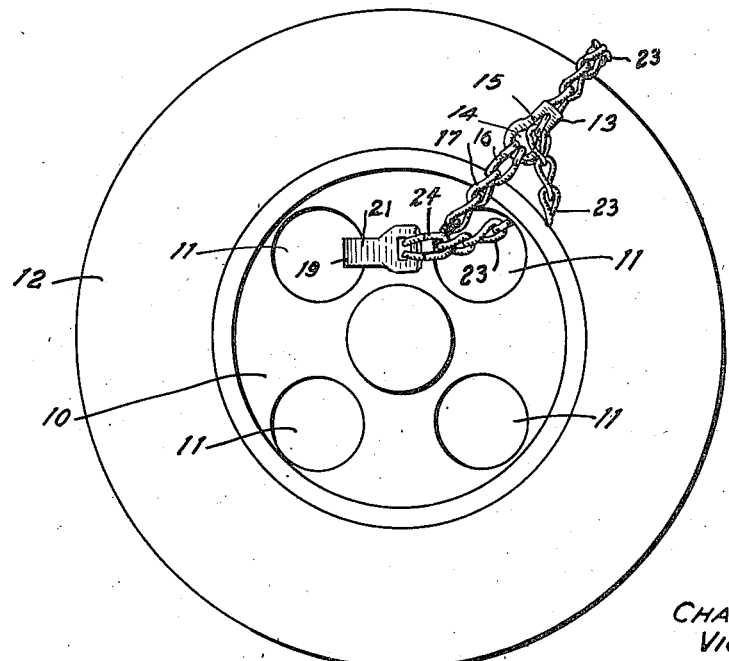
INVENTORS
CHARLES G. LOFGREN
VICTOR SALINAS
BY
ATTORNEY.

Patented Dec. 30, 1947

2,433,567

UNITED STATES PATENT OFFICE 2,433,567

EMERGENCY TIRE CHAIN FOR TRUCKS

Charles G. Lofgren and Victor H. Salinas,
Denver, Colo.

Application March 10, 1947, Serial No. 733,590

4 Claims. (Cl. 152—233)

This invention relates to an emergency tire chain for trucks, and has for its principal object the provision of a light, easily portable, single chain unit which can be quickly and easily applied to the wheels of a truck while the latter are embedded in mud, snow, or ice, in order to extricate the wheels.

Another object of the invention is to so construct the device that it can be quickly and easily attached and detached, regardless of the position of the wheels, without the use of tools of any kind.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved emergency tire chain for vehicles; and Fig. 2 is a side view of a typical truck wheel, illustrating the improved chain in place thereon.

In Fig. 2 a typical vehicle wheel of the truck type is illustrated at 10, with its spoke openings at 11 and its tire at 12. The invention is applicable to any type of wheel having openings and can be used on either single or dual tires.

The invention comprises a link locking ring 13 having a round, enlarged chain passage 14 from which a relatively narrow chain locking slot 15 extends. The link locking ring 13 is secured by means of a terminal link 16 to a relatively short length of chain 17, approximately 8 inches in length. The other end of the short chain 17 is connected by means of a second terminal link 18 to a U-shaped hook member 19.

The hook member 19 preferably consists of a flat bar bent back upon itself to form two legs, a long leg 20 and a short leg 21. The extremity of each leg is widened and provided with an elongated slot 22 for receiving the terminal links of the chain.

The terminal link 18 of the short chain 17 is connected to the long leg 20. A relatively long length of chain 23 is connected by means of a third terminal link 24 through the slot 22 of the short leg 21.

The above constitutes the complete device. The chain is of the truck type having twisted links, and is preferably of a size having a width at the widest part of the link of approximately one inch. The long chain 23 is approximately three feet long.

The chain is applied to the wheel 10 as shown in Fig. 2 by hooking the long leg 21 of the hook 19 through one of the openings 11 so that it will extend rearwardly (at the top of the wheel). The short length of chain 17 is then passed behind the wheel and outwardly through the next rearward wheel opening 10. The long length of the chain 23 is passed inwardly through the latter wheel opening, thence around the tire 12, and its extremity is passed through the chain opening 14 of the link locking ring 13. The chain 23 is pulled taut and the last link which can be reached by the locking link 13 is slipped sidewise into the locking slot 15. The device is now ready for use.

The improved emergency chain is not designed for continual use. It is more particularly designed to be applied to a wheel that is stuck in a mud hole or in snow or ice. It can be easily applied, to the top of the wheel regardless of the depth of embedment of the bottom of the wheel, and when the wheel has been extricated, a simple pull on the extremity of the chain 23 will release the locked link from the slot 16 and allow the entire device to be slipped from place.

As illustrated in Fig. 2, it is shown applied to a wheel for forward driving, so that the drag upon the chain 23 will pull upon the spoke section between the holes 11 through the medium of the hook 19. If it is more advisable to extricate the stuck wheel by reverse movement, the chain is applied in the opposite direction by hooking the hook 19 around the forward side of an upper hole 11, thence passing the chain through the next forward hole.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An emergency tire chain for vehicles of the type having a plurality of openings through a driving wheel carrying a tire, comprising: a hook member arranged to be hooked to said wheel through one of the openings; a relatively short chain secured to one extremity of the hook member and adapted to pass on the inside of the wheel and outwardly through a second opening; a relatively long length of chain secured to the other extremity of said hook member and adapted to pass inwardly through the second opening, thence around the tire to the extremity of the short length of chain; and attachment means on the extremity of said short length for engaging the long length at any desired point.

2. An emergency tire chain for vehicles of the type having a plurality of openings through a driving wheel carrying a tire, comprising: a hook member arranged to be hooked to said wheel through one of the openings; a relatively short chain secured to one extremity of the hook member and adapted to pass on the inside of the wheel and outwardly through a second opening; a relatively long length of chain secured to the other extremity of said hook member and adapted to pass inwardly through the second opening, thence around the tire to the extremity of the short length of chain; and a locking ring on the extremity of the short length having an enlarged opening for the passage of the extremity of the long length, there being a slot extending from said opening for locking the locking ring to any link of the long length.

3. An emergency tire chain for vehicles of the type having a plurality of openings through a driving wheel carrying a tire, comprising: a hook member arranged to be hooked to said wheel through one of the openings; a relatively short chain secured to one extremity of the hook member and adapted to pass on the inside of the wheel and outwardly through a second opening; a relatively long length of chain secured to the other extremity of said hook member and adapted to pass inwardly through the second opening, thence around the tire to the extremity of the short length of chain; and attachment means on the extremity of said short length for engaging the long length at any desired point, said hook member being U-shaped and having a long and a short leg, the short length of chain being secured to the extremity of the long leg, and the long length of chain being secured to the extremity of the short length.

4. An emergency chain for trucks comprising: a chain locking ring having an enlarged passage for a chain and a relatively narrow slot for engaging a chain link; a short length of chain extending from said locking ring; a hook member, said short length of chain being secured to the extremity of one leg of said hook member; and a long length of chain secured to the extremity of the other leg of said hook member.

CHARLES G. LOFGREN.
VICTOR H. SALINAS.